United States Patent [19]

Wössner et al.

[11] 4,312,499
[45] Jan. 26, 1982

[54] SHOCK ABSORBER ASSEMBLY WITH OPERATIONALLY CONTROLLED HYDRAULIC-MECHANICAL DAMPING SYSTEM

[75] Inventors: Felix Wössner, Schweinfurt; Hermann Itzinger, Dittelbrunn; Günther Handke, Euerbach; Wilhelm Koch, Bongard, all of Fed. Rep. of Germany

[73] Assignee: Fichtel & Sachs AG, Schweinfurt, Fed. Rep. of Germany

[21] Appl. No.: 114,845

[22] Filed: Jan. 24, 1980

[51] Int. Cl.³ .............................................. F16F 9/48
[52] U.S. Cl. ...................................... 267/8 R; 188/288
[58] Field of Search ............... 188/271, 284, 287, 288, 188/316; 267/8 R

[56] References Cited

U.S. PATENT DOCUMENTS

| | | | |
|---|---|---|---|
| 2,735,670 | 2/1956 | Schultze | 188/287 X |
| 2,928,507 | 3/1960 | Thompson | 188/271 |
| 3,889,934 | 6/1975 | Kamman | 188/287 X |
| 4,078,638 | 3/1978 | Koyama et al. | 188/288 |
| 4,183,509 | 1/1980 | Nishikawa et al. | 267/8 R |

Primary Examiner—William A. Cuchlinski, Jr.
Attorney, Agent, or Firm—Toren, McGeady and Stanger

[57] ABSTRACT

A shock absorber assembly including a cylinder having a piston and piston rod mechanism movable relative thereto is formed with a hydraulic-mechanical damping system interposed in an annular space defined between the piston rod and the cylinder. The damping characteristics of the system are varied in accordance with the relative movement of the piston rod out of the cylinder by a damping mechanism which includes a spring, an annular member and a damping component operating to vary the cross-sectional area of the damping passage defined therethrough.

14 Claims, 6 Drawing Figures

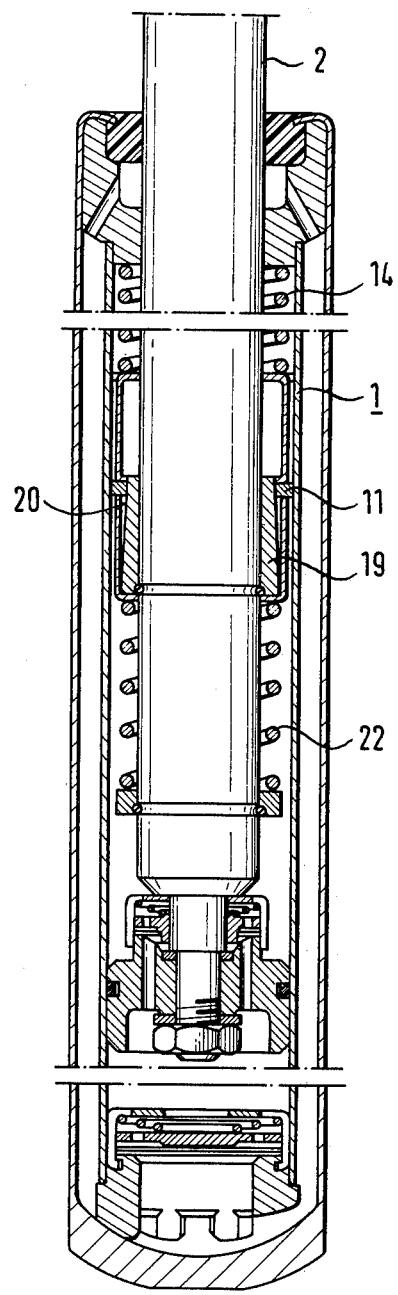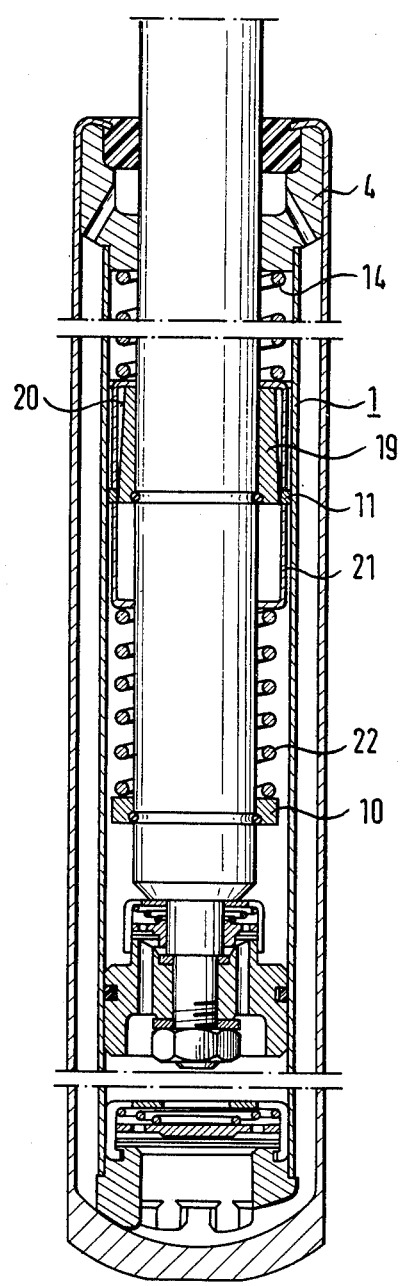

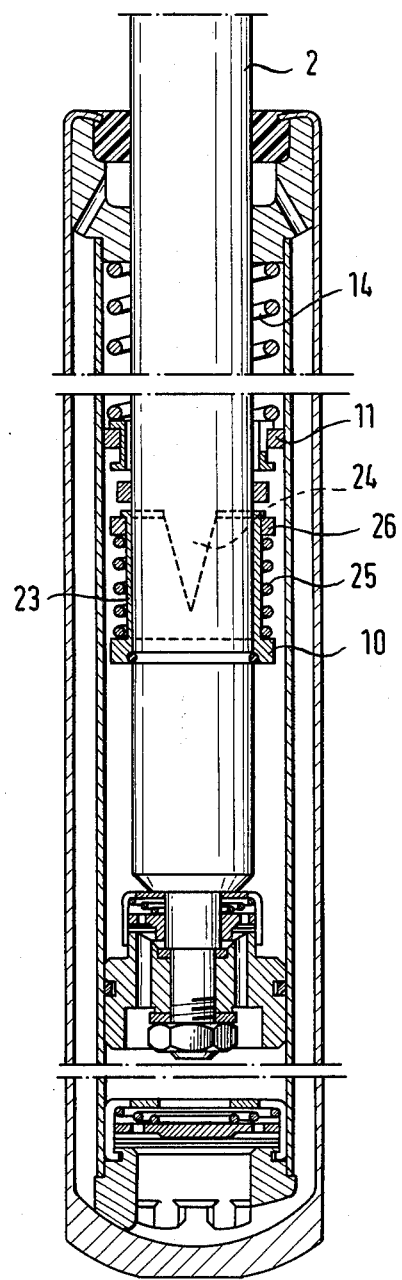
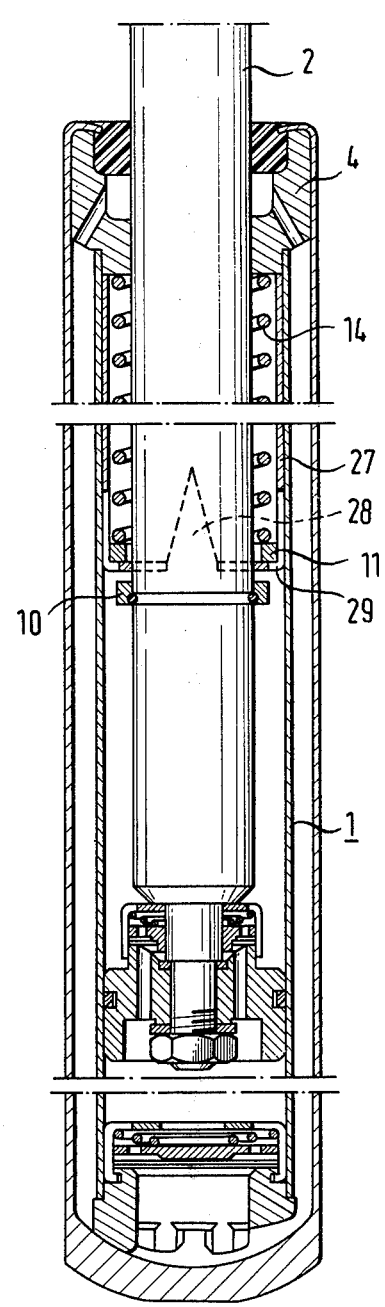

SHOCK ABSORBER ASSEMBLY WITH OPERATIONALLY CONTROLLED HYDRAULIC-MECHANICAL DAMPING SYSTEM

The present invention relates generally to a shock absorber assembly or telescopic strut mechanism, particularly one which utilizes a hydraulic-mechanical damping system.

Systems of the type to which the present invention relates usually consist of a cylinder in which there is arranged an axially movable piston which is connected to a piston rod and which is provided with damping devices for damping the relative movement between the piston rod and the cylinder. A guide and seal member for the piston rod is arranged on a cylinder end, and the hydraulic-mechanical damping system arranged in the annular space between the cylinder and the piston rod operates to effect damping of the stop action in a manner which is variable in dependence upon the distance of extension of the piston rod relative to the cylinder.

Hydraulic-mechanical damping systems which produce additional damping action when the piston rod is extended by a predetermined distance relative to the cylinder are known. In the use of such hydraulic damping systems, the effective cross sections of the passage for effecting pull damping change suddenly so that, when the piston rod is extended at a relatively high speed, a very steep rise in the damping force characteristic is created during operation under hydraulic pull damping. This not only impairs the driving comfort, but also creates disturbing noises.

It is the task of the present invention to provide a hydraulic-mechanical damping system which eliminates many of the disadvantages of prior art structures, ensures a smooth response upon actuation of the damping system, does not create disturbing noises and provides high functional safety.

SUMMARY OF THE INVENTION

Briefly, in accordance with the present invention, the damping device of the damping system is formed by at least one annular member which is under the influence of a spring and which cooperates with a damping component arranged on the piston rod or in the cylinder for varying the damping cross section. Such variation of the damping cross section makes it possible for the hydraulic damping action of the damping system to start smoothly and evenly when the piston rod is extended at a relatively high speed. As a result, excellent driving comfort is obtained. This smooth response of the damping action of the damping system further operates to ensure that no disturbing noises are created.

In accordance with one feature of the invention the cylinder is provided with at least one groove extending in longitudinal direction for effecting variation of the damping cross section. Such an embodiment is especially suitable in cylinder tubes having a thick wall. In cylinders having a thin wall, in accordance with a further feature of the invention, each longitudinally extending groove is formed by a bead which extends conically and is produced by a cold-working process. In accordance with a further feature, the bead is constructed in such a manner that the passage cross section formed between the bead and the annular member becomes continuously smaller when the annular member is moved in the direction toward the piston rod guide. Such a passage cross-sectional area which becomes continuously smaller when the piston rod is extended results in a very smooth actuation of the hydraulic pull damping action.

In another embodiment of the invention, a variation of the damping passage cross-sectional area which is controlled in accordance with the relative distance moved by the piston rod during hydraulic pull damping is obtained in a simple manner in that the cylinder is provided on its outer surface with a sleeve which, together with the cylinder, forms an annular space having in flow communication therewith radial bores which are arranged in the cylinder.

In accordance with another feature of the invention, a variation in the cross-sectional area of the damping passage is obtained by a control bushing fastened on the piston rod which is provided with a slightly conically designed outer surface. On this control bushing there is axially movably arranged a slotted ring which is guided by actuating sleeves, with each actuating sleeve having an end face constructed as a stop face for a spring.

In accordance with additional embodiments, hydraulic-mechanical damping systems which are controlled in dependence upon the extended distance of the piston rod are obtained in that the piston rod is provided with a damping sleeve which has at least one wedge-shaped slot and on which there is axially movably arranged a spring-loaded actuating ring which forms the stop for the sleeve. In an embodiment of this type, it is easily possible to construct the wedge-shaped slot in the sleeve in such a way that a residual cross section remains free when the actuating ring is in a lowermost position, i.e., when the spring arranged between the actuating ring and the stop ring is fully compressed.

As indicated herein, the invention provides a simple embodiment of the damping system that, on that end of the cylinder where the piston rod extends out of the cylinder, a cylinder bushing having at least one wedge-shaped slot is arranged on the inner surface of the cylinder, the cylinder bushing receiving the spring-loaded ring. In accordance with a feature of the invention, the cylinder bushing is on its end facing toward the piston provided with an inwardly bent collar whose diameter is larger than the outer diameter of the stop ring fastened on the piston rod, wherein this collar forms the stop for the spring-loaded ring.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE DRAWINGS

In the Drawings

FIG. 3 is a sectional view showing a change of the passage cross section by means of a slotted ring whose diameter is changed by means of a conical outer surface;

FIG. 4 is a sectional view showing the shock absorber according to FIG. 3 wherein the slotted ring rests against the inner wall of the cylinder;

FIG. 5 is a sectional view showing an embodiment in which a damping sleeve is arranged on the piston rod; and FIG. 6 is a sectional view showing a shock absorber having a cylinder sleeve arranged in the cylinder.

DETAILED DESCRIPTION OF THE PREFERRED EMBODIMENTS

Figure 1:
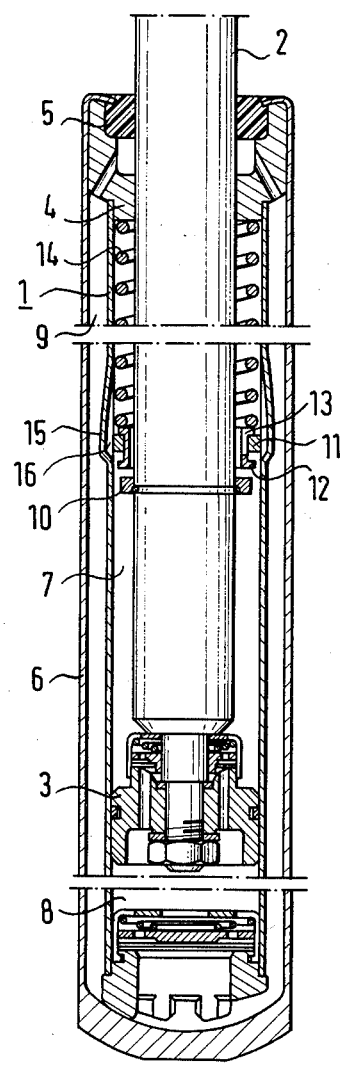
FIG. 1 is a sectional view showing a double-tube shock absorber whose damping passage cross section which is variable in dependence upon the extended distance of the piston rod is formed by beads provided in the cylinder.

The shock absorber according to FIG. 1 consists of a cylinder 1 in which a piston rod 2 connected to a piston 3 is guided by means of a piston rod guide 4, the interior of the cylinder 1 being sealed by a piston rod seal 5. The piston rod guide 4 also centers the cylinder 1 in a container 6. The interior space of the cylinder 1 is divided by the piston 3, provided with damping devices for pull-push damping, into an annular work chamber 7, defined by the piston rod 2 and the cylinder 1, and a work chamber 8 arranged below the piston 3.

Between the cylinder 1 and the container 6 there is provided a compensating space 9 which can be connected to the work chamber 8 through a bottom valve arranged at the lower end of the cylinder 1. A stop ring 10 is fastened, at least in the axial direction, on the piston rod 2, while a control sleeve 12 which is under the influence of a spring 14 receives an annular member or ring 11. The ring 11 is slotted and, due to its spreading force, it is pressed against the inner wall of the cylinder. Due to the axially movable arrangement of the ring 11 in the control sleeve 12, apertures 13 of the control sleeve can be closed and opened so that the ring 11, together with the control sleeve 12, forms a type of check valve.

In the cylinder 1, there is arranged a bead 15 which, together with the ring 11, forms a passage cross-section 16. The bead 15 is constructed in such a manner that the passage cross-section 16 becomes smaller when the ring 11 is moved in a direction toward the piston rod guide 4.

In the following, the operation of the hydraulic-mechanical damping system which is controlled in dependence upon the distance as it is shown in FIG. 1 is described.

When the piston rod 2 is extended out of the cylinder 1, starting with a certain extended distance, the stop ring 10 connected to the piston rod 2 comes into contact with the end face of the control sleeve 12 and as a result, when the piston rod is further extended, the ring 11 in the control sleeve 12 is moved downwardly and, thus, the apertures 13 of the control sleeve 12 are closed. Since the passage cross-section 16 is effective between the ring 11 and the bead 15, this passage cross-section 16, together with a constantly open cross-section which, for example, is formed by the slot of the ring 11, forms the passage cross-section which determines the hydraulic damping of the damping system.

When the piston rod 2 is further extended, the passage cross-section 16 becomes even smaller and, at the end of the groove or the bead 15, it becomes zero, so that now only the cross-section of the slot of the ring 11 is effective. Accordingly, the hydraulic damping effect increases continuously and a smooth rise of the damping force characteristic is obtained, the force generated by the spring 14 also being directed opposite to the extending movement of the piston rod 2. When the speed of the piston is zero, only the spring force of the spring 14 acts as a force for inserting or retracting the piston rod 2.

When the piston rod 2 is retracted into the cylinder 1, the control sleeve 12 moves downwardly and the ring 11, due to the friction at the inner wall of the cylinder 1, is moved axially upwardly in the control sleeve 12 and, therefore, releases the apertures 13. Accordingly, the retracting movement of the piston rod takes place without hydraulic damping and is reinforced by the spring 14 until the control sleeve 12 is lifted off the stop ring 10. In order to achieve exact actuation of the damping system at a predetermined distance of extension of the piston rod 2 and for fixing the control sleeve 12 or the ring 11 in its initial position, it is preferred to arrange in the cylinder a stop for the ring 11 which limits the retracting movement of the ring 11 in the axial direction toward the piston 3. As a result of this measure, it is ensured that the ring 11 is in any case held in that position in the cylinder 1 in which the passage cross section 16 is largest before the damping system is actuated.

Figure 2:
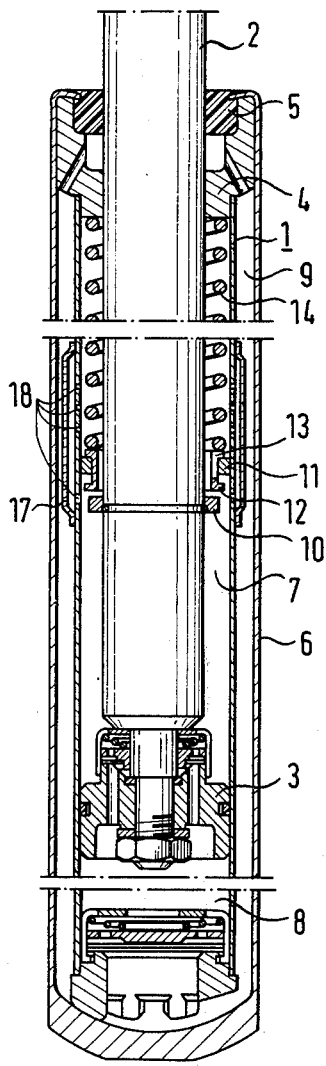
FIG. 2 is a sectional view showing a shock absorber in which the damping passage cross section variable in dependence upon the extended distance of the piston rod is formed by radial bores in the cylinder.

The embodiment according to FIG. 2 differs from that according to FIG. 1 essentially by the arrangement of the sleeve 17 on the outer surface of the cylinder 1. Together with the cylinder 1, the sleeve 17 forms an annular space into which radial bores 18 arranged in the cylinder 1 extend in flow communication. The bores 18 and the sleeve 17 provide a passage cross-section which is variable in dependence upon the distance between the space in which the spring 14 is arranged and the partial space of the work chamber 7 located underneath the stop ring 10. In this embodiment, the passage cross-section is varied in stages; i.e. by moving past the radial bores 18.

The shock absorber according to FIGS. 3 and 4 has a hydraulic-mechanical damping system which, in addition to the stop ring 10 fastened on the piston rod 2, includes a control bushing 19 which is also fastened on the piston rod 2. This control bushing 19 has a conical outer surface 20 on which the slotted ring 11 is axially movably guided by the actuating sleeves 21. Each of these actuating sleeves 21 has an end face serving as a stop for a spring. The spring 22 is fixed between the lower actuating sleeve 21 and the stop ring 10, while the upper actuating sleeve 21 forms the stop face for the spring 14.

The position of the actuating sleeves 21 in FIG. 3 has the effect that, between the slotted ring 11 and the inner wall of the cylinder 1, an annular gap is provided which connects the space in which the spring 22 is located with the space in which the spring 14 is arranged so that hydraulic fluid can flow through this gap. In this position of the ring 11, no hydraulic damping of the damping system occurs. If, on the other hand, the piston rod 2 is extended beyond a certain distance out of the cylinder 1, the spring 14 bears with one of its end faces against the piston rod guide 4 and is pretensioned. The spring 14 is designed in such a way that it overcomes the spring force of the spring 22 and presses the actuating sleeves 21 downwardly so that the slotted ring 11 is moved downwardly on the conical outer surface 20 of the control sleeve 19 and, simultaneously, due to the increase of the diameter, is guided toward the inner wall of the cylinder 1. In this position, as the damping passage cross-section, only the cross-section formed by the slot of the ring 11 is provided so that, in the position illustrated in FIG. 4, the hydraulic damping of the damping system is fully effective.

The damping system according to FIG. 5 consists essentially of the stop ring 10 fastened on the piston rod 2, the stop ring 10 forming the stop for the damping sleeve 23. This damping sleeve 23 has a wedge-shaped slot 24, illustrated in dotted lines, which can be passed by the actuating ring 26 loaded by the spring 25 since this actuating ring 26 is axially movably guided on the damping sleeve 23. Starting with a predetermined distance of extension of the piston rod 2, this actuating ring 26 makes contact with the ring 11 loaded by the spring 14 and, upon further extension of the piston rod 2, is moved axially downwardly so that, as a result of the design of the slot 24, the damping passage cross-section is continuously decreased. This wedge-shaped slot 24 can be constructed in such a way that, when the actuating ring 26 is fully retracted onto the damping sleeve 23, i.e., when the spring 25 is fully compressed, a small passage cross-section is still present which forms a damping passage cross-sectional area corresponding with the maximum hydraulic pull damping characteristic.

Another embodiment of a damping system in accordance with the invention is illustrated in FIG. 6, wherein the cylinder sleeve 27 is arranged at the upper end of the cylinder 1 and receives the ring 11. The spring 14 bears against piston rod guide 4, on the one hand, and against the ring 11, on the other hand. For limiting the axial movement of the ring 11, the cylinder sleeve 27 is provided with the collar 29. Control of the damping passage cross-sectional area of the piston rod 2 in dependence upon the extended distance is effected by means of the wedge-shaped slot 28 in the cylinder sleeve 27 in connection with the position of the ring 11 during the extension of the piston rod 2 out of the cylinder 1. During this extension movement of the piston rod 2, the stop ring 10, whose outer diameter is smaller than the inner diameter of the collar 29, engages the ring 11 and moves the latter against the force of the spring 14 in the cylinder sleeve 27. The passage cross section formed by the wedge-shaped slot 28 continuously decreases during this extension movement so that, finally, only the passage cross section formed, for example, by the slot of the ring 11, remains as the damping passage cross-section.

The above-described hydraulic-mechanical damping systems cannot only be used in double-tube vibration dampers; they can also be used in single-tube shock absorbers. It is also possible to readily utilize these damping devices in gas springs.

While specific embodiments of the invention have been shown and described in detail to illustrate the application of the inventive principles, it will be understood that the invention may be embodied otherwise without departing from such principles.

What is claimed is:

1. A shock absorber assembly comprising:
cylinder means;
piston means including piston rod means axially movably arranged within said cylinder means and having damping means for damping movement of said piston means relative to said cylinder means;
guide and seal means for said piston rod means arranged at one end of said cylinder means;
said cylinder means and said piston rod means being arranged to define an annular space therebetween; and
a hydraulic-mechanical damping system arranged in said annular space between said cylinder means and said piston rod means defining a damping flow path adapted to have the cross-sectional flow area thereof varied for providing variable damping characteristics in response to the degree of relative axial movement between said piston means and said cylinder means;
said hydraulic-mechanical damping system comprising spring means, an annular member arranged to be axially movable relative to said piston rod means in response to the action of said spring means and damping component means arranged to cooperate with said annular member to effect variation of the cross-sectional flow area of said damping flow path in response to relative movement between said piston rod means and said cylinder means, said annular member and said damping component means being configured for cooperation with each other and with said spring means such that said cross-sectional flow area of said damping flow path is continuously incrementally reduced when said piston rod means is moved to a predetermined degree outwardly of said cylinder means and substantially abruptly increased upon reverse movement of said piston rod means inwardly of said cylinder means.

2. A shock absorber assembly according to claim 1, wherein said cylinder means is provided with at least one groove extending in the longitudinal direction thereof for effecting said variation of said damping cross-sectional flow area.

3. A shock absorber assembly according to claim 2, wherein a plurality of said longitudinal grooves are provided and wherein each longitudinal groove is formed by means of a bead which extends conically and is produced by a cold-working process.

4. A shock absorber assembly according to claim 3, wherein said damping flow path comprises a damping passage formed between said bead and said annular member which becomes continuously smaller when said annular member is moved in the direction toward said guide and seal means.

5. A shock absorber assembly according to claim 1, wherein said cylinder means is provided with a sleeve arranged on the outer surface thereof said sleeve together with said cylinder means forming an annular space, said assembly further comprising radial bores arranged in said cylinder means leading into said annular space.

6. A shock absorber assembly comprising:
cylinder means;
piston means including piston rod means axially movably arranged within said cylinder means and having damping means for damping movement of said piston means relative to said cylinder means;
guide and seal means for said piston rod means arranged at one end of said cylinder means;
said cylinder means and said piston rod means being arranged to define an annular space therebetween; and
a hydraulic-mechanical damping system arranged in said annular space between said cylinder means and said piston rod means for providing variable damping characteristics determined by the degree of relative axial movement between said piston means and said cylinder means;
said hydraulic-mechanical damping system comprising spring means, an annular member arranged to be operatively engaged by said spring means and a damping component mounted on one of said piston rod means and said cylinder means and operating with said annular member to effect variation of a damping cross-sectional flow area defined therethrough in response to relative movement between said piston rod means and said cylinder means;

said assembly further comprising a control bushing fastened on said piston rod means and provided with a slightly conically designed outer surface, said annular member being formed as a slotted ring axially movably arranged in said control bushing and guided by actuating sleeves, each actuating sleeve having an end face serving as a stop face for said spring means.

7. A shock absorber assembly comprising:
cylinder means;
piston means including piston rod means axially movably arranged within said cylinder means and having damping means for damping movement of said piston means relative to said cylinder means;
guide and seal means for said piston rod means arranged at one end of said cylinder means;
said cylinder means and said piston rod means being arranged to define an annular space therebetween; and
a hydraulic-mechanical damping system arranged in said annular space between said cylinder means and said piston rod means for providing variable damping characteristics determined by the degree of relative axial movement between said piston means and said cylinder means;
said hydraulic-mechanical damping system comprising spring means, an annular member arranged to be operatively engaged by said spring means and a damping component mounted on one of said piston rod means and said cylinder means and operating with said annular member to effect variation of a damping cross-sectional flow area defined therethrough in response to relative movement between said piston rod means and said cylinder means;
said piston rod means being provided with a damping sleeve which has at least one wedge-shaped slot and on which there is axially movably arranged a spring-loaded actuating ring which forms a stop for said annular member.

8. A shock absorber assembly comprising:
cylinder means;
piston means including piston rod means axially movably arranged within said cylinder means and having damping means for damping movement of said piston means relative to said cylinder means;
guide and seal means for said piston rod means arranged at one end of said cylinder means;
said cylinder means and said piston rod means being arranged to define an annular space therebetween; and
a hydraulic-mechanical damping system arranged in said annular space between said cylinder means and said piston rod means for providing variable damping characteristics determined by the degree of relative axial movement between said piston means and said cylinder means;
said hydraulic-mechanical damping system comprising spring means, an annular member arranged to be operatively engaged by said spring means and a damping component mounted on one of said piston rod means and said cylinder means and operating with said annular member to effect variation of a damping cross-sectional flow area defined therethrough in response to relative movement between said piston rod means and said cylinder means;
with a cylinder bushing being arranged at the end of said cylinder means where said piston rod means extends outwardly thereof, said cylinder bushing having at least one wedge-shaped slot and being arranged on the inner surface of said cylinder means, said bushing receiving said annular member.

9. A shock absorber assembly according to claim 8, further comprising a stop ring fastened on said piston rod means, said cylinder bushing having at its end facing toward said piston means an inwardly bent collar whose diameter is larger than the outer diameter of said stop ring, said collar forming a stop for said annular member.

10. A fluidic damping unit particularly suitable for use as a shock absorber comprising: cylinder means; piston rod means operably interposed within said cylinder means for reciprocal movement between a pair of terminal positions representing, respectively, the fully extended and the fully retracted positions of said piston rod means relative to said cylinder means; a guiding and sealing unit operably mounting said piston rod means relative to one end of said cylinder means; piston means affixed to said piston rod means within said cylinder means dividing the interior of said cylinder means into a pair of fluidic working chambers, one of said working chambers being defined between said guiding and sealing unit and said piston means; and composite damping means operably interposed within said cylinder means in said one working chamber, said composite damping means comprising a damping ring dividing said one working chamber into a first partial chamber adjoining said guiding and sealing unit and a second partial chamber adjoining said piston means, said first and second partial chambers being interconnected by throttled fluid passage means extending across said damping ring, a compression spring interposed between said damping ring and said guiding and sealing unit, a spring compression member fixed on said piston rod means, said damping ring remaining stationary with respect to said cylinder means during a first portion of the axial stroke of said piston rod means adjacent said fully retracted position thereof and being moved by said spring compression member approaching said guiding and sealing unit against the resistance of said compression spring only during a second portion of said axial stroke adjacent said fully extended position thereof, the flow cross-section of said throttled passage means being responsive to both the axial position of said damping ring during said second portion of the axial stroke and the direction of movement of said piston rod means with respect to said cylinder means such that said flow cross-section is increasingly reduced when said damping ring approaches said guiding and sealing unit and that said flow cross-section is substantially abruptly increased when return movement of said damping ring away from said guiding and sealing unit begins.

11. A fluidic damping unit as set forth in claim 10 wherein said damping ring is in frictional engagement with an inner cylindrical face of said cylinder means, said damping ring is received by a control member, said control member is engageable with said compression spring by one of its axial ends and engageable with said spring compression member by the other of its axial ends, said damping ring is axially movable with respect to said control member between a first terminal position adjacent said one end of said control member and a second terminal position adjacent said other axial end of said control member, the flow cross-section in said first terminal position being larger than the flow cross-section in said second terminal position and wherein a bypass is defined in said cylinder means across said damping ring, the flow cross-section of said bypass being reduced when said damping ring approaches said guiding and sealing unit during at least part of said second portion of said axial stroke.

12. A fluidic damping unit as set forth in claim 11 wherein said bypass is defined by a groove in said inner cylindrical face of said cylinder means.

13. A fluidic damping unit as set forth in claim 11 wherein said bypass comprises a series of radial holes distributed along the axis to said cylinder means, said radial holes being interconnected on the radially outer side of said cylinder means by a bypass chamber.

14. A fluidic damping unit as set forth in claim 11 wherein said control member is defined by a control sleeve adjacent the inner periphery of said damping ring and radially outwardly directed flanges adjacent the axial ends of said control sleeve, said control sleeve being provided with at least one slot adjacent said one axial end of said control member.

* * * * *